(12) United States Patent
Akers

(10) Patent No.: US 6,598,304 B2
(45) Date of Patent: *Jul. 29, 2003

(54) LASER LEVELING SYSTEM, APPARATUS AND METHOD FOR BUILDING CONSTRUCTION

(76) Inventor: Paul Akers, 3725 Irongate Rd., Suite 105, Bellingham, WA (US) 98226

( * ) Notice: Subject to any disclaimer, the term of this patent is extended or adjusted under 35 U.S.C. 154(b) by 0 days.

This patent is subject to a terminal disclaimer.

(21) Appl. No.: 10/080,207

(22) Filed: Feb. 19, 2002

(65) Prior Publication Data

US 2002/0174552 A1 Nov. 28, 2002

Related U.S. Application Data

(63) Continuation of application No. 09/867,575, filed on May 29, 2001, now abandoned, which is a continuation of application No. 09/227,414, filed on Jan. 8, 1999, now Pat. No. 6,256,895.
(60) Provisional application No. 60/070,765, filed on Jan. 8, 1998.

(51) Int. Cl.[7] .............................................. G01C 15/00
(52) U.S. Cl. .......................................... 33/286; 33/290
(58) Field of Search ........................... 33/281, 285, 286, 33/290, 293, 296, 406, 488, 809, DIG. 21

(56) References Cited

U.S. PATENT DOCUMENTS

| | | | |
|---|---|---|---|
| 2,661,653 A | 12/1953 | Castiglia | |
| 3,190,008 A | 6/1965 | Weiss | |
| 3,277,579 A | * 10/1966 | Murphy | 33/372 |
| 3,328,887 A | * 7/1967 | Wright | 33/372 |
| 3,462,845 A | * 8/1969 | Matthews | 33/286 |
| 3,559,336 A | 2/1971 | Nozaki | |
| 3,588,249 A | 6/1971 | Studebaker | |
| 3,612,700 A | 10/1971 | Nelson | |
| 3,631,601 A | 1/1972 | McNulty | |
| 3,771,876 A | 11/1973 | Ljungdahl et al. | |
| 3,775,929 A | * 12/1973 | Roodvoets et al. | 33/286 |
| 3,815,250 A | 6/1974 | Roodvoets et al. | |
| 3,894,230 A | 7/1975 | Rorden et al. | |
| 3,897,637 A | 8/1975 | Genho | |
| 3,907,435 A | 9/1975 | Roodvoets | |
| 3,982,839 A | 9/1976 | Schwartz | |
| 4,142,798 A | 3/1979 | Barbee, Jr. | |
| 4,183,667 A | 1/1980 | Denton | |
| 4,338,728 A | 7/1982 | Valead | |
| 4,679,937 A | 7/1987 | Cain et al. | |
| 4,718,171 A | 1/1988 | Schlemmer et al. | |
| 4,757,616 A | 7/1988 | Hills | |
| 4,854,704 A | 8/1989 | Funazaki et al. | |
| 4,891,888 A | 1/1990 | Maria De Bree et al. | |
| 4,899,452 A | 2/1990 | Schafer | |
| 4,993,160 A | 2/1991 | Fraley | |

(List continued on next page.)

FOREIGN PATENT DOCUMENTS

| | | | |
|---|---|---|---|
| DE | 003505049 A | 8/1986 | |
| GB | 2200385 A | * 8/1988 | 33/372 |
| JP | 63040809 A | * 2/1988 | 33/281 |
| JP | 403090811 A | 4/1991 | |
| JP | 4031337512 A | 6/1991 | |

Primary Examiner—Diego Gutierrez
Assistant Examiner—Mirellys Jagan
(74) Attorney, Agent, or Firm—Michael R. Schacht; Schacht Law Office, Inc.

(57) ABSTRACT

A leveling assembly to establish elevations in a building structure for installing cabinets, bookshelves, countertops, etc. There is a telescoping mounting post adapted to be positioned in bearing engagement between a floor surface and the top of a doorway, ceiling or other upper surface. A laser that transmits a horizontal laser beam is mounted to a mounting device that can be moved to different positions along the length of the post. Locking devices hold the laser-mounting device in place, and also properly position the post to be in firm engagement with its bearing surfaces. The laser-mounting device can be swung to upper and lower positions.

16 Claims, 8 Drawing Sheets

U.S. PATENT DOCUMENTS

| | | |
|---|---|---|
| 5,038,493 A | 8/1991 | Stabs |
| 5,212,889 A | 5/1993 | Lysen |
| 5,272,814 A | 12/1993 | Key |
| 5,317,813 A | 6/1994 | Reed |
| 5,359,781 A | 11/1994 | Melville |
| 5,367,779 A | 11/1994 | Lee |
| 5,461,793 A | 10/1995 | Melville |
| 5,505,000 A * | 4/1996 | Cooke .................. 33/286 |
| 5,533,268 A | 7/1996 | Keightley |
| 5,539,990 A | 7/1996 | Le |
| 5,566,459 A | 10/1996 | Breda |
| 5,621,531 A | 4/1997 | Van Andel et al. |
| 5,653,415 A | 8/1997 | Schworer |
| 5,782,003 A | 7/1998 | Bozzo |
| 5,819,424 A | 10/1998 | Ohtomo et al. |
| 5,829,147 A | 11/1998 | Kousek et al. |
| 5,872,657 A | 2/1999 | Rando |
| 5,894,344 A | 4/1999 | Tamez et al. |
| 5,907,907 A | 6/1999 | Ohtomo et al. |
| 6,087,645 A | 7/2000 | Kitajima et al. |
| 6,438,854 B1 * | 8/2002 | Kott, Jr. .................. 33/286 |
| 2002/0017028 A1 * | 2/2002 | Wishart .................. 33/286 |

* cited by examiner

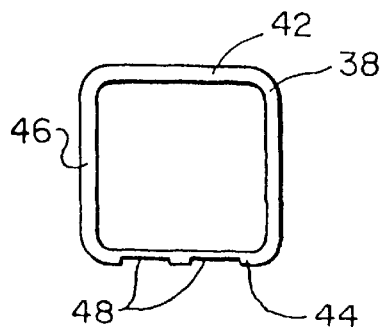
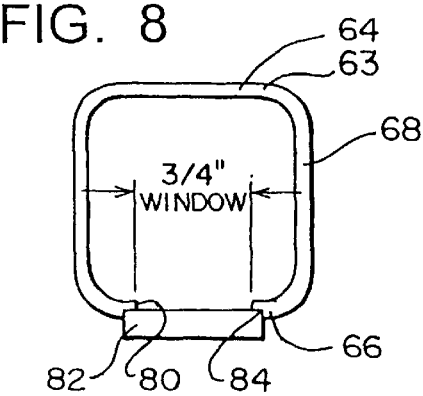
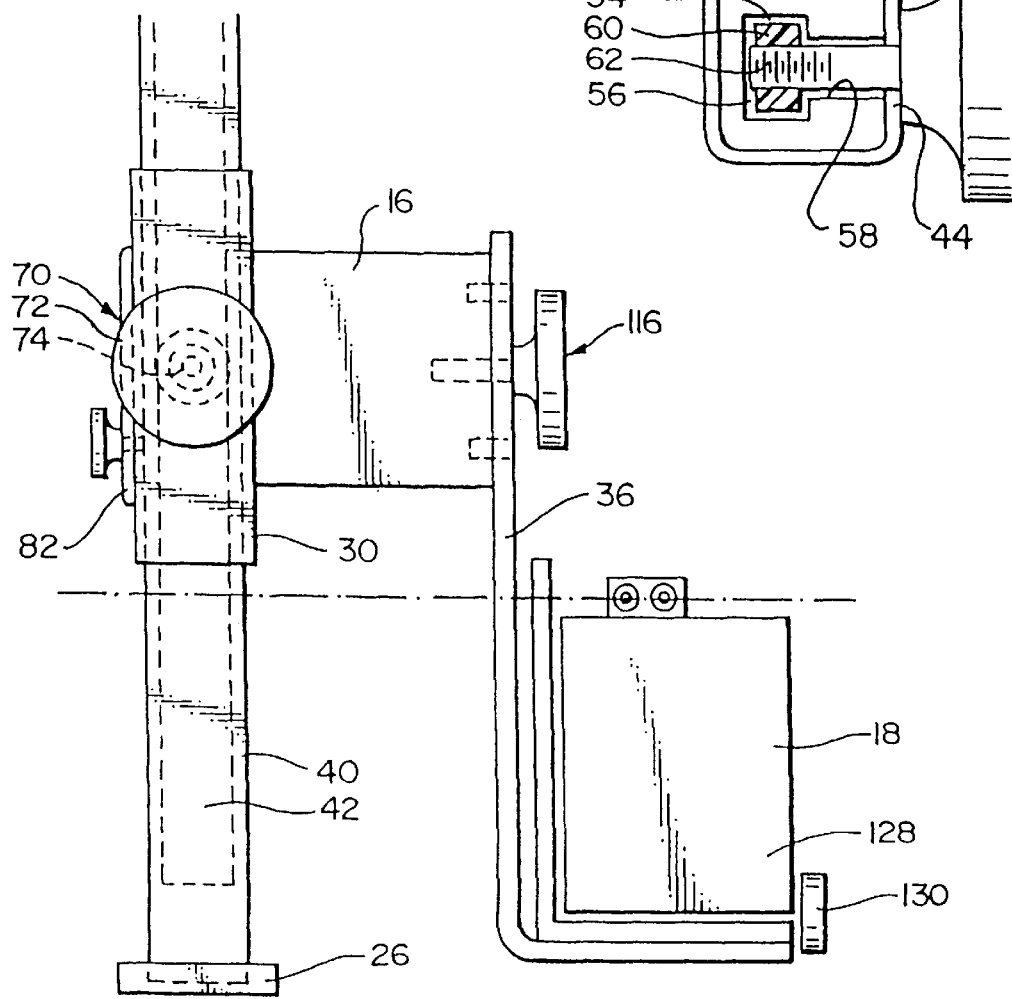

LASER LEVELING SYSTEM, APPARATUS AND METHOD FOR BUILDING CONSTRUCTION

RELATED REFERENCES

This application is a continuation of U.S. Ser. No. 09/867,575, filed on May. 29, 2001, now abandoned, which is a continuation of U.S. Ser. No. 09/227,414, filed Jan. 8, 1999, now U.S. Pat. No. 6,256,895, which claims priority of U.S. Provisional Application Ser. No. 60/070,765, filed on Jan. 08,1998.

BACKGROUND OF THE INVENTION a) Field of the Invention

The present invention relates to a laser leveling system, apparatus and method particularly adapted for use in construction projects, and more particularly for construction projects where it is necessary to position a variety of components of the building structure at various locations and at specific height locations (e.g. cabinets, bookshelves, countertops, etc.).

b) Background Art

There are numerous situations in the construction industry where it is necessary to ascertain elevation locations, and also to locate various components at precise elevations. This is a task that confronts surveyors, carpenters, brick layers, and others.

The surveyor commonly uses a leveling instrument which is mounted to the top end of a tripod so as to rotate about a vertical axis while maintaining its horizontal orientation within close tolerances. Also, a conventional surveyor's transit will commonly be designed to function as a leveling instrument. These surveying instruments are usually used to place the foundation and possibly other elements of the building at the proper location and elevation. Then, as the more specific components are put into place, other locating and leveling techniques are commonly used.

A typical example is where a carpenter or cabinet maker is installing cabinets, countertops, bookshelves, etc. A common technique is to use chalk lines where a vertical elevation is established, such as measuring up a certain distance from the floor level. Then the countertops, cabinets, and other components are positioned using this chalk line as a elevation reference. The chalk line can be positioned by use of establishing one vertical location, and then using a carpenter's level to align the chalk line horizontally. Another method is simply to establish two vertical locations independently (e.g. by measuring ascertain distance up from the floor level at different locations), then making elevation marks, and stringing the chalk line between the marks.

For a number of decades, optical tooling has been used to establish locations and also elevations. Within more recent years, laser instruments have been utilized for this purpose. A search of the patent literature disclosed various concepts relating to the use of laser instruments in establishing elevations and performing other functions. These are as follows:

U.S. Pat. No. 5,566,459 (Breda) shows a laser sighting device in a housing provided with spirit levels so that the device can be leveled and aligned. There are optical elements provided so that a beam can be projected in the desired path.

U.S. Pat. No. 5,533,268 (Keightley) shows a laser sighting device that "draws" a line in both a horizontal and vertical path for use in compound surfaces such as large chemical reaction chambers. The mirror is adjusted in two planes as it rotates.

U.S. Pat. No. 5,272,834 (Key) shows a surveying device which is mounted to a tripod and in which the user can observe alight beam on the surface of surveyor's rod 14.

U.S. Pat. No. 4,718,171 (Schlemmer) shows a rotating laser beam system in which the laser beam is projected onto a staid which is provided with optical sensors 7 that provide an indication of height displayed in an output 3. This also is mounted to a tripod.

U.S. Pat. No. 3,588,249 (Studebaker) shows a right angle rotating light directing means such as a mirror or pentaprism 82. The light directing means is mounted on a rotating hollow shaft through which a laser directs light straight upward to the right angle directing means. The device is secured to an easily adjusted leveling means, and it is shown being mounted to a mobile vehicle and also to a tripod.

U.S. Pat. No. 2,661,653 (Castiglia) shows a light projecting device which is provided with a bubble level 6, that allows the device to be aligned. The device is provided with a housing that can be rotated by hand to point in any direction. The light beam is aimed at a target placed on a floor, and as the target is moved the misalignment of the floor can be measured. The device of course could be used as is the instant invention to establish alignment points on a wall or the like.

U.S. Pat. No. 4,183,667 (Denton) shows what is called a "light-ray indicator" and is supported by a universal joint, with a weight at the lower end so as to seek a plumb line.

The following five patents also relate in general in laser/optical leveling devices, and deal mostly with improvements to the leveling apparatus itself. These are the following:

U.S. Pat. No. 5,539,990 (Le)
U.S. Pat. No. 5,212,889 (Lysen)
U.S. Pat. No. 4,854,704 (Funazaki et al.)
U.S. Pat. No. 4,679,937 (Cain et al.)
U.S. Pat. No. 3,771,876 (Ljungdahl et al.)

To the best knowledge of the applicant herein, while various precision leveling instruments have been available for many, many decades (and even centuries), and although optical/laser leveling devices have also been available for decades, many tasks that are performed on a day to day basis in the construction industry where it is required to establish height elevations within reasonably close tolerances do not employ these types of instruments. Rather, the use of chalk lines, carpenter levels, tape measurers (measuring a vertical distance from a base location), etc. continue to be commonly used.

A typical instance is where a skilled carpenter or cabinet maker is installing cabinets, countertops, bookshelves and other articles. In large part, the more sophisticated leveling instruments that have been available for many decades or centuries as well as the more recent optical/laser leveling systems, which have been available for many years, carpenters and cabinet makers in large part still rely on the simpler methods as indicated above (plumb lines, leveling instruments, measuring from floor level, etc.).

Accordingly, it is an object of the present invention to provide a system, apparatus and method which incorporates a laser instrument where there is a balance of desirable features which makes it particularly convenient, "user-friendly", and efficient, and also a system where the set-up and use at various locations can be accomplished quickly and easily.

The present invention was developed to meet this need.

SUMMARY OF THE INVENTION

The laser leveling assembly of the present invention is used to establish height locations at selected locations, and it is particularly adapted for use at a location where there is a lower upwardly facing support surface and an upper downwardly facing bearing surface, such as a building structure having a floor support surface, and an upper bearing surface, such as an upper section of a doorway, a ceiling or an upper panel or member.

The laser assembly comprises a laser instrument to transmit a horizontally directed laser beam at laterally spaced locations to indicate a selected elevation or elevations at such spaced locations.

There is a mounting post having a longitudinal axis. This post comprises a lower contact end arranged to engage the lower support surface to establish a lower mounting location for the post. The post further comprises an upper contact end portion arranged to engage the upper bearing surface to establish an upper mounting location for the post so that the post can be positioned between the upper and lower locations so as to have a substantial vertical alignment component. Also, the mounting post provides a guideway extending along the longitudinal axis.

There is an instrument mounting device mounted to the post for movement along the guideway to a selected height position or positions. The mounting device is arranged to support the instrument in an operating position where the instrument can transmit the laser beam toward laterally spaced locations.

In a preferred form, one of the contact ends of the post is longitudinally adjustable so that the contact ends can be moved toward and away from one another. More particularly, in the preferred form the post comprises a first elongate post section connecting to the first contact end portion, and a second post section telescopically engaging the first post section and having the upper contact end.

The mounting device in the preferred form comprises a post engaging portion arranged to be fixedly positioned to the post and arranged to be able to move along the guideway of the post. There is an instrument mounting portion arranged to mount the instrument in its operating position. There is also an intermediate mounting portion connecting the post engaging portion and the instrument mounting portion.

In the preferred form, the intermediate mounting portion is arranged so that the instrument mounting portion can be located at different vertical locations relative to the post engaging portion.

In a preferred embodiment, the intermediate mounting portion comprises a support arm rotatably mounted so as to be able to rotate between an upper arm position to support the instrument mounting portion in an upper location and a lower arm location to support the instrument mounting portion at a lower location. More specifically, the intermediate mounting portion comprises a laterally extending offset mounting member to locate the instrument mounting portion at a location spaced laterally from the mounting post so that the instrument mounting portion would be able to move clear of an object located closely adjacent to the mounting post.

In a specific form, the intermediate mounting portion comprises a vertically oriented mounting member to be able to support said instrument mounting portion at height locations spaced laterally from the post engaging portion. The vertically oriented mounting portion is adjustable so as to be able to position the instrument mounting portion either above or below the elevation of the post engaging portion.

As a further feature, the mounting post has an elevation indicating portion positioned along the longitudinal axis of the post to indicate vertical location relative to the post. The mounting device has a height indicating device positioned to enable height location of the mounting device to be determined. In a preferred form, the elevation indicating portion has indicia increasing from a lower location to an upper location to indicate distance from a lower location, and also indicia increasing from an upper location toward a lower location to indicate distance from the upper location to the lower location.

The mounting device in a preferred form comprises a post engaging portion extending at least partially around the post, and providing a height indication device positioned adjacent to the distance indicating portion. More specifically, the height indicating device is mounted so as to be vertically adjustable relative to the post engaging portion. More specifically, said height indicating device comprises a vertically moveable transparent member with a height indicator thereon.

There is a post locking and stabilizing device comprising a threaded rotatable member which is mounted to the post and which can be rotated into and out of locking engagement to insert a lateral force relative to said telescoping members when in locking engagement. The assembly further comprises an instrument mounting locking device which operably engages the mounting device and the post and which comprises a rotatable threaded member to come into locking engagement between said instrument mounting device and said post.

In the method of the present invention, the assembly as recited above is employed. The laser instrument is mounted to the instrument mounting device which in turn is mounted to the post. The post is positioned so that the lower contact end of the post engages a lower support surface, and an upper contact end portion of the post engages the upper bearing surface so that the post is positioned between the upper and lower locations so as to have a substantial vertical alignment component, with the post providing a guideway extending the longitudinal axis.

The laser instrument is placed at the proper location on the post, and the laser instrument is then operated to direct a laser beam toward the location (e.g. a wall) where the elevation is to be established. Then the mounting device can be raised or lowered, placed in upper or lower locations relative to the mounting device, and adjustments made to facilitate the directing of the laser beam to the appropriate height location.

Other features of the present invention will become apparent from the following detailed description.

BRIEF DESCRIPTION OF THE DRAWINGS

FIG. 7 is a cross-sectional view taken along line 8—8 of FIG. 6, but showing only the mounting sleeve of the laser instrument mounting section;

FIG. 8 is a sectional view similar to FIG. 7 showing the slide member;

FIG. 9 is a sectional view taken along line 8—8 of FIG. 5 illustrating the locking and alignment mechanism between the main post and inner-telescoping member of the post section; and FIG. 10 is a view similar to FIG. 5, but showing the laser instrument mounted in an upright position, with the mounting device in its lower position;

DESCRIPTION OF THE PREFERRED EMBODIMENT

Figure 1:
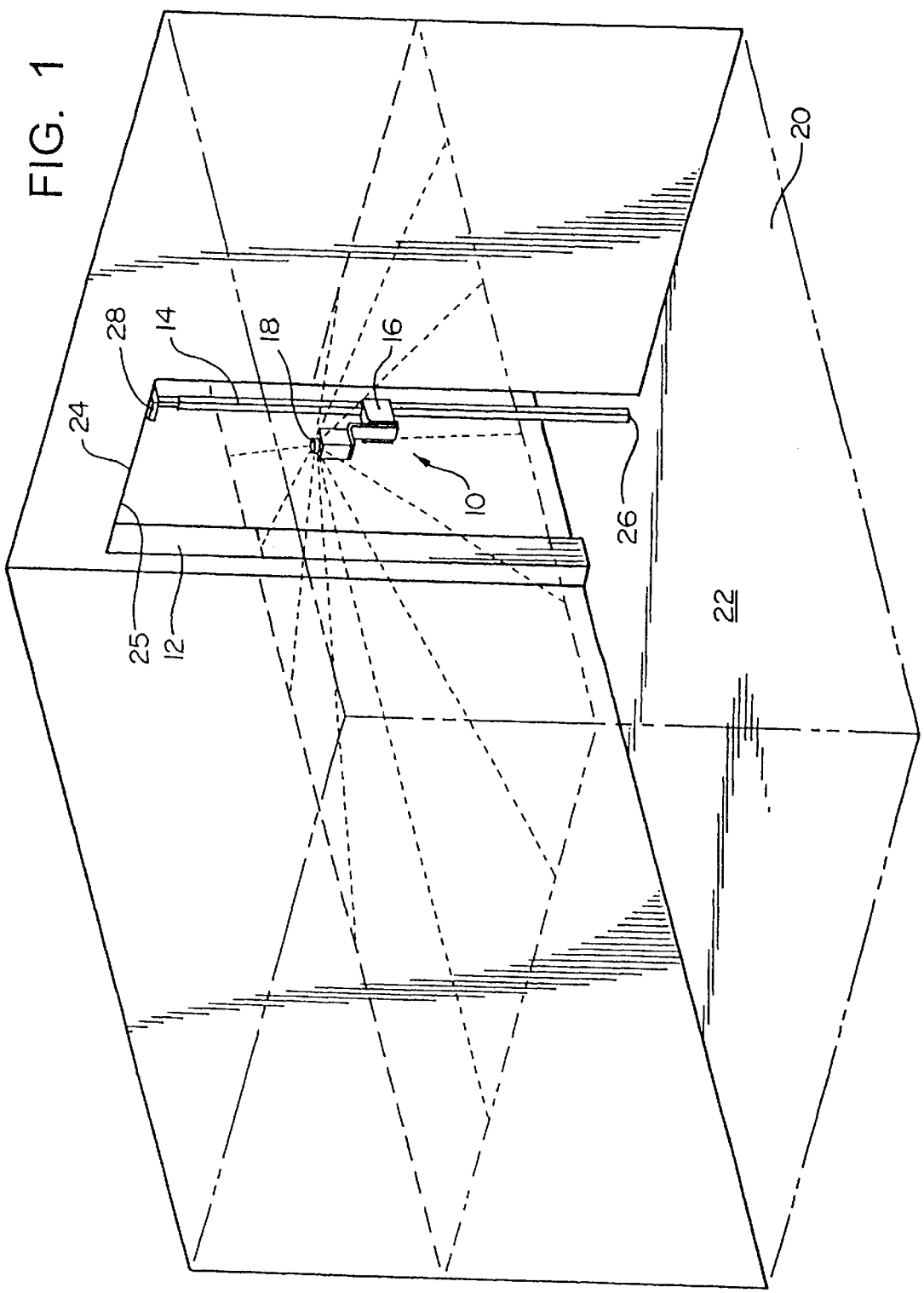
FIG. 1 is an isometric view showing the present invention, installed n a doorway, being used to position some kitchen cabinets.
Figure 2:
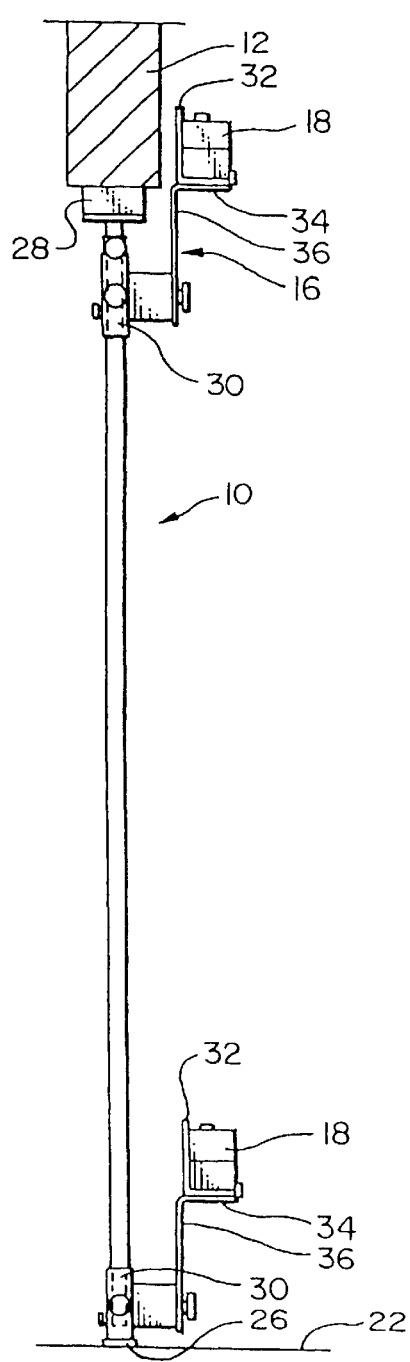
FIG. 2 is a side elevational view of the apparatus of the present invention, installed in a doorway of a building, and showing the laser leveling instrument positioned at an upper location and also a lower location.
Figure 3:
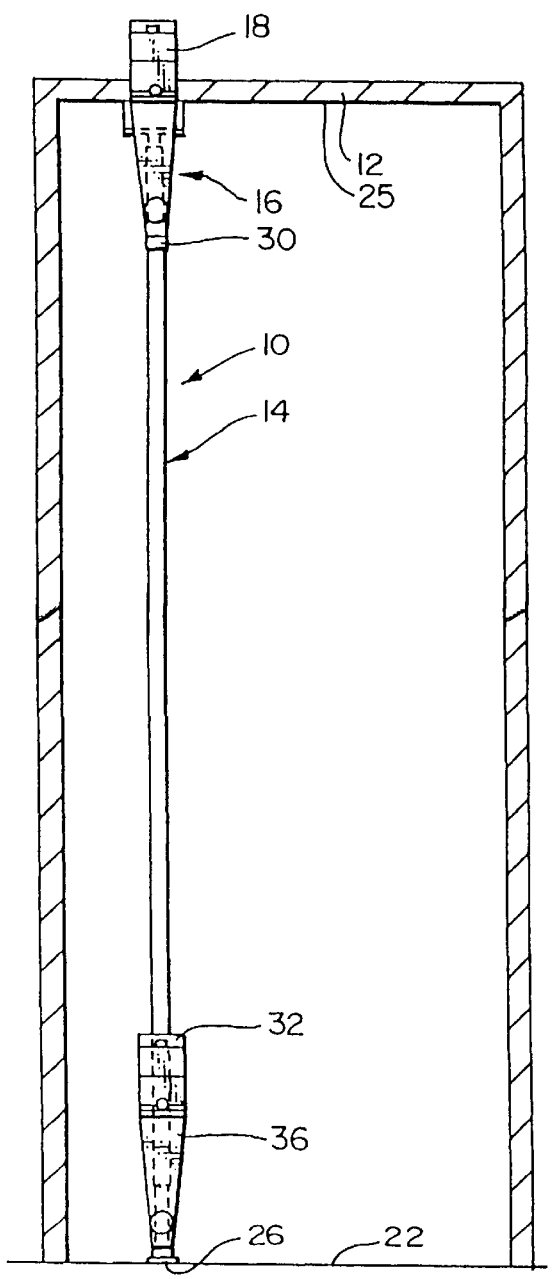
FIG. 3 is a front elevational view of the apparatus, as shown in FIG. 1.

With reference initially to FIGS. 1,2 and 3 the apparatus 10 of the present invention is shown mounted in a doorway 12 in its operating position. This apparatus 10 comprises a post section 14, a laser mounting section 16, and a laser instrument 18.

In FIGS. 1–3, there is shown the floor 20 having an upwardly facing surface 22 and an upper doorway member 24 having a downwardly facing bearing surface 25. The post section has a lower contact end 26 pressing against the floor surface 22, and an upper contact end 28 pressing upwardly against the bearing surface 25 of the upper doorway member 24. In the position of FIGS. 1-2, the post section 14 is held securely in vertical alignment between the surfaces 22 and 25.

The mounting section 16 and the laser instrument 18 are shown in FIGS. 2 and 3 in both a lower and an upper position (it being understood that normally there would be only one mounting section 16 and one laser instrument 18 in the apparatus 10). The mounting section 18 comprises a post engaging portion 30, and a laser mounting portion 32. The laser mounting portion 32 in turn can be considered to comprise a laser platform member 34 by which the laser instrument 18 is mounted, and an intermediate mounting portion 36 which interconnects the laser platform member 34 with the post engaging portion 30.

The post engaging portion 30 is slide mounted to the post section 16 and can be moved to various selected locations along the length of the post sections 14. To describe the post section 14 in more detail, this post section 14 comprises a main post 38 and an inner-telescoping post member 40, slide mounted within the main post 38. The aforementioned contact end 26 is at the lower end of the main post 38, and this contact end 26 can conveniently be provided as a relatively hard rubber or plastic electrically insulating pad having a high coefficient of friction so that it reliably engages the floor surface 22.

As shown in FIG. 7, the main post 38 has a square cross-sectional configuration, having a front wall 42, rear wall 44 and two sidewalls 46. The rear wall 44 is slightly recessed so as to form two shallow vertically extending channels, and there are two scales 48 (i.e. measuring tapes or rulers) having length markings thereon (either inches marked in increments of a quarter inch, an eighth inch, etc., in the metric system, or both). One scale 48 reads upwardly from the floor as a zero location, with the length designations increasing in an upward direction, and the other length marking member 48 has the markings increasing in lengthwise dimension from an upward location (the latter being used when one is measuring down from a ceiling location or other upper reference plane).

Figure 6:
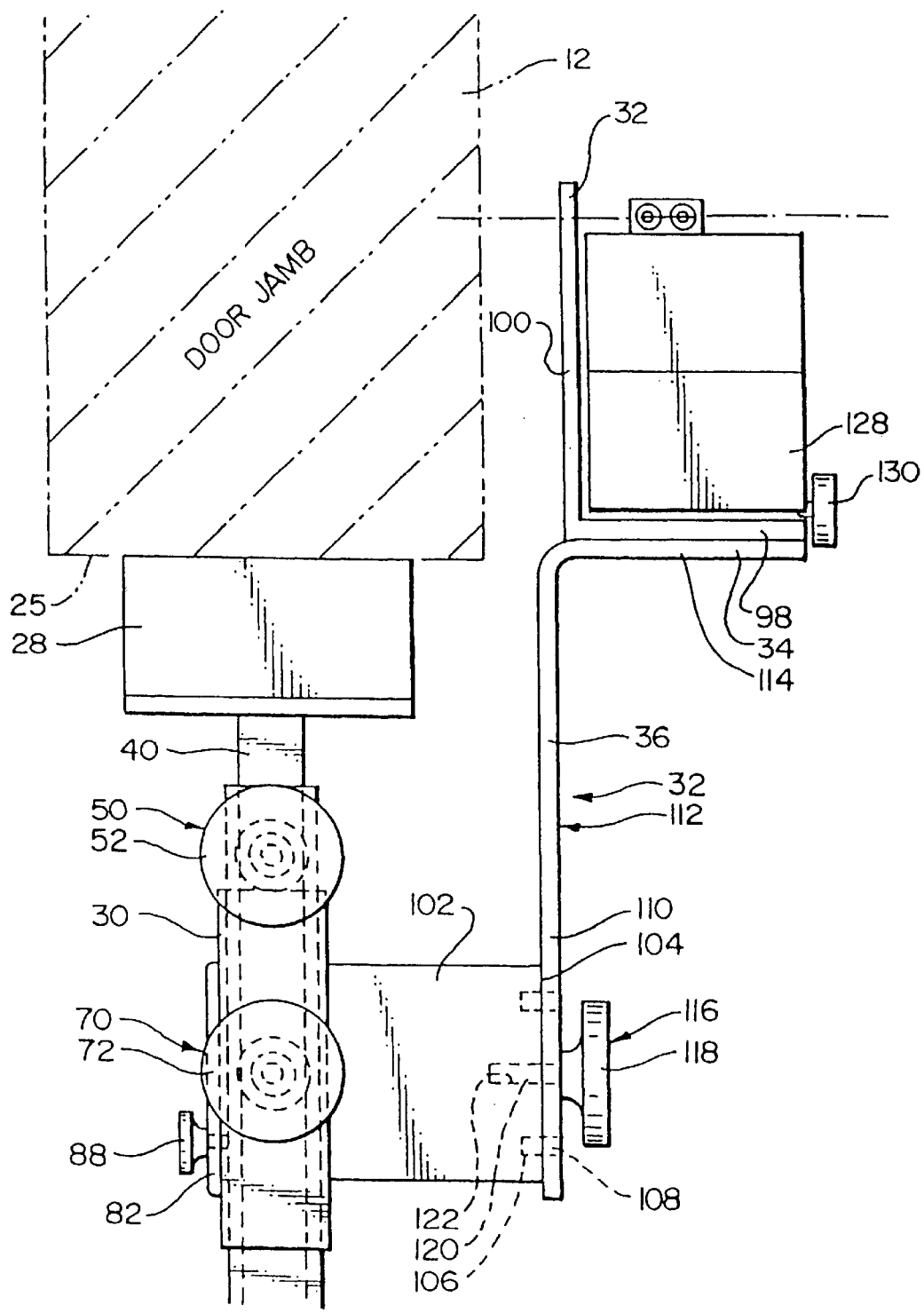
FIG. 6 is a side elevational view, drawn to an enlarged scale, showing the laser leveling instrument in the upper position, as shown in FIG. 2 (top part)

With reference to FIG. 6, it can be seen that the telescoping post member 40 engages at its upper end the upper contact end 28 which is shown herein as a moderately flexible rubber or plastic electrically insulating pad being moderately compressible and having a sufficiently high coefficient of friction to reliably engage the upper surface 25 of the upper door member 24 or other member or component (e.g. a ceiling of a room) which is to engage the upper contact end 28. In operation, when the post section 16 is mounted in its upright operating position, the post section 14 is (as shown in FIGS. 1–3) placed in a location such as a doorway, so as to be substantially vertically aligned. Then the upper telescoping member 40 is moved upwardly to press the upper contact end 28 against the downwardly facing upper surface 25 after which a post stabilizing and locking member 50 (FIGS. 6 and 9) is operated by turning the handle 52 of the member 50 so as to lock the main post 38 and the telescoping member 40 together in the positions so that the post section 14 is securely positioned between the floor surface 20, and the door member 25.

The inner-telescoping member 40 has a "U" shaped cross sectional configuration and defines an elongate slot 54 extending along the entire length of the member 40. This slot 54 has a "T" shape, so that the rear end of the slot has an expanded slot portion 56 and a necked down portion 58, so as to have a "T" shaped cross section. The locking member comprises a plastic insert 60, about six inches long and having a uniform "T" shaped cross section so that it fits snugly within the slot 54.

The aforementioned locking knob 52 connects to a threaded bolt member 62 which in turn fits in a threaded bore in the insert 60. The knob 52 is rotated to cause the threaded bolt member 62 to draw the insert 60 laterally so that it presses the telescoping member 40 firmly against the inside surface of the sidewall 44 of the main post 38. Then when it is desired to move the telescoping member 40, the knob 52 is rotated in the opposite direction to loosen the clamping insert 60 and permit slide movement of the telescoping post member 40.

Figure 11:
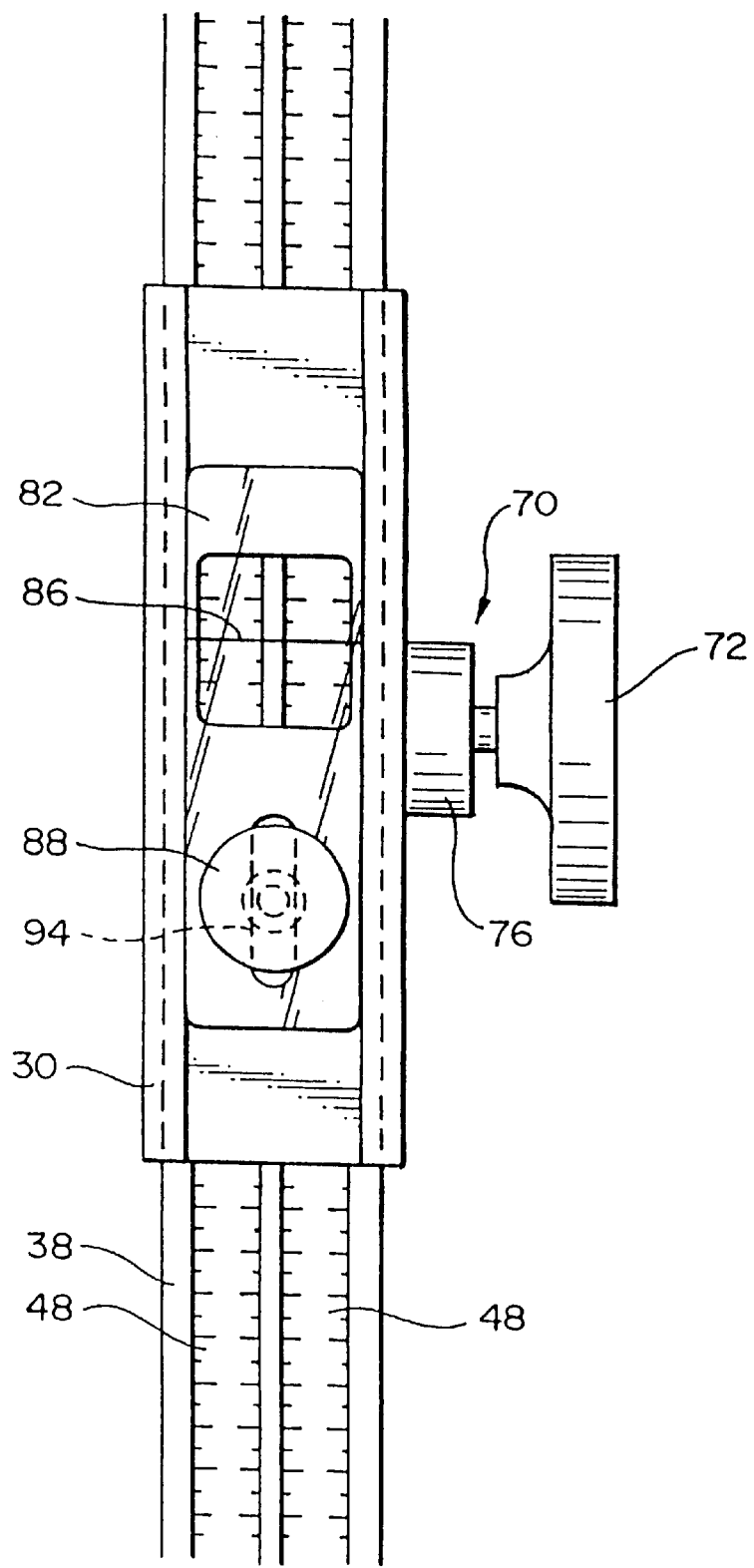
FIG. 11 is a rear elevational view drawn to an enlarged scale, showing the post mounting portion of the laser mounting section.

As indicated previously, the mounting section 16 comprises the post engaging portion 30 and the laser mounting portion 32. To describe the post engaging portion 30 in more detail, reference will now be made to FIGS. 8 and 11.

In FIG. 8, it can be seen that the post engaging portion 30 comprises a slide member 63 having a vertical dimension of about five inches and a square cross sectional configuration with rounded corner portions. The main post 38 functions as a guide way (or slide way) for the post engaging portion 30. The post engaging portion 30 comprises a front wall 64, a rear wall 66 and two side walls 68. Mounted to one side wall 68 is a locking device 70 (See FIGS. 4, 7 and 10) which comprises a knob 72 connected to a bolt 74 that is in turn threaded into a block 76 welded or otherwise secured to the side wall 68. The contact end of the bolt 74 has a hard rubber surface or other non-scoring material which bears against the side wall 46 of the main post 38. By rotating the knob 70, the bolt 74 moves inwardly to press against the side wall 46 of the main post 38 and hold the post engaging portion 30 in a fixed location relative to the main post 38.

The rear wall 66 of the slide member 63 is provided with a cut-out 80 (see FIGS. 8 and 11) to provide a window through which the operator can observe the height markings on the scales 48. A rectangular clear plastic plate 82 is positioned in a shallow recess 84 formed in the rear wall 66, and extending the entire length thereof and this clear plastic piece 82 has a horizontal reference line 86 which can be adjusted upwardly and downwardly by moving the clear plastic plate 82 either upwardly or downwardly.

To hold the plate 82 in place, there is provided a locking member 88 comprising a rotatable knob 90 connected to a threaded bolt member 92 that extends through an elongate slot 94 (see FIG. 10) formed in the clear plastic member 82, and into a threaded retaining socket in the member 63. By rotating the knob 90 to an unlocking position, the clear plate 82 can be adjusted upwardly or downwardly so as to properly locate the reference line 86 relative to the height location markings 48. When the clear plastic member 82 is at the desired location, then it can be locked in that position by rotating the knob 98 inwardly to engage the plastic member 82 and press it against the rear wall 66 of the mounting member 30. The plastic member 82 can be adjusted to place the reference line 86 at a desired reference location so that the person using the apparatus 12 is able to "fine tune" the reading of the elevation of the reference beam from the laser 18.

To continue the description of the mounting section 16, as indicated previously, there is the laser mounting portion 32, which in turn is made up of a laser platform member 34 and an intermediate mounting portion 36. The laser mounting platform 34 comprises an "L" shaped plate member comprising a horizontal plate portion 98 and a vertical plate portion 100, joined to one another in the "L" shaped configuration. The laser instrument 18 is, or may be, of conventional design, and it can be removably bolted or otherwise connected to the laser platform member 34.

The intermediate mounting portion 36 comprises first a laterally extending rectangular member 102 having its rear end welded or otherwise joined to the front wall 64 of the post engaging mounting portion 30. At the forward vertical surface 104 of the plate member 102 there is a pair of cylindrical pockets or recesses 106, each of which receives a locating pin 108. The locating pin 108 also fits within matching recesses in a vertical plate 110 of an "L" shaped member 112 which also comprises lateral plate 114. The horizontal plate 114 connects to the horizontal plate 98 of the laser platform member 34.

The mounting member 112 is held securely to the plate 102 by connecting member 116 comprising a rotatable handle 118 that is in turn connected to a bolt member 120 that fits in a matching threaded socket 122 in the mounting plate 102. By rotating the knob 118 inwardly, the bearing surface of the knob 118 bears against the plate member 110 to press it firmly against the forward surface 104 of the plate 102.

Figure 4:
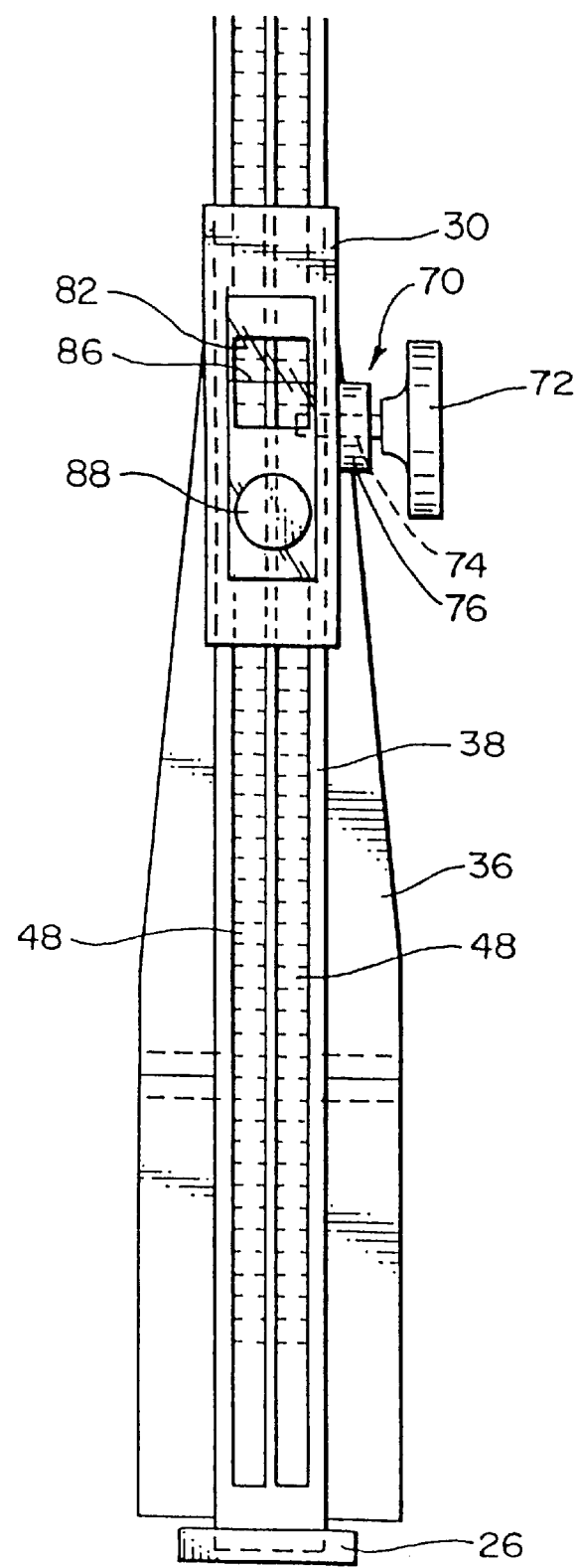
FIG. 4 is a side elevational view, drawn to an enlarged scale, showing the laser leveling apparatus in an inverted lower position.
Figure 5:
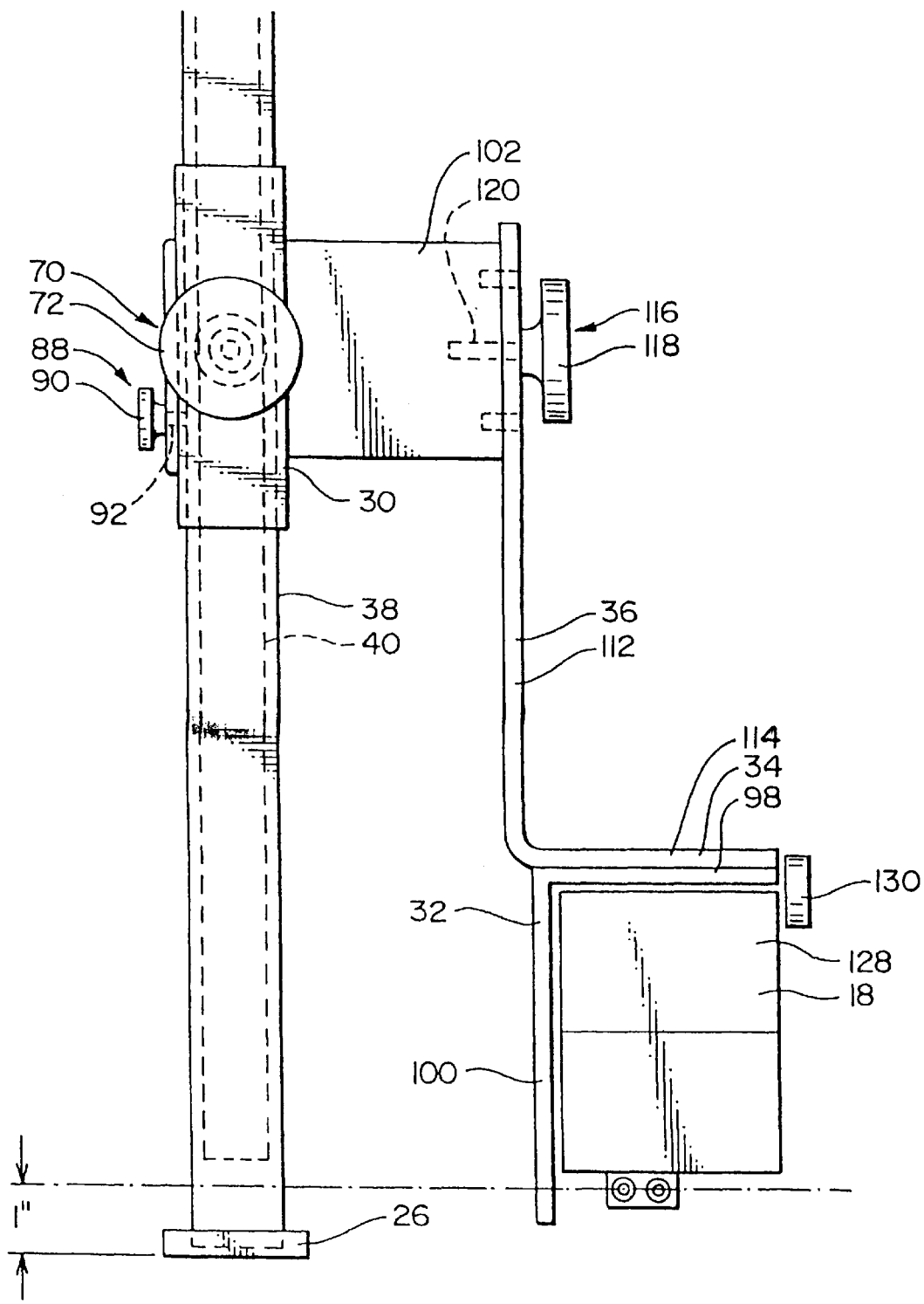
FIG. 5 is a side elevational view, drawn to an enlarged scale showing a laser leveling instrument in a non-inverted lower position.

The mounting section 16 is arranged so that the "L" shaped intermediate mounting member 112 can be inverted to the position of FIG. 4 simply by loosening the locking member 118 to its release position, and then inverting the intermediate member 112 from the position of FIG. 5 to the position of FIG. 3, and again relocking the member 112 in place. At the same time, the laser platform member 34 can be moved to the opposite side of the horizontal plate 114, as shown in FIG. 4, so as to properly position the laser instrument 18 in an upright position.

As indicated previously, the laser instrument 18 is, or may be, of a conventional design. The instrument 18 is provided with a suitable base structure indicated schematically at 128, where there is shown a single adjusting knob 130. This base 128 is provided with an adjustable leveling mechanism, such as that provided in a conventional surveyor's transit or leveling device, where there are leveling bubbles oriented to right angles to one another, and the instrument 18 can be adjusted to a level position within very close tolerances.

The laser instrument 18 is arranged to be battery operated, and it directs a laser beam horizontally, causing the beam to move laterally and scan a wide angular area.

To describe the operation of the present invention, let us take a typical example where there is a house under construction, and the construction process has progressed to where there is a bare wood floor, and the drywall of most of the room has been put in place. The next step is for a skilled carpenter to place various built-in cabinets, countertops, shelves, etc. The doorways have been constructed, but the doors have not yet been hung.

Let us assume that one of the first tasks for the carpenter is to install the built-in cupboards and countertops in the desirable countertop height of thirty six inches above the floor.

The apparatus 10 initially has the pole section 14 in its fully contracted section, where the telescoping post ;member 40 is fully retracted so that the overall length of the post section 14 is somewhat less than the height of a conventional doorway (e.g. about eighty inches). The lower contact end 26 is positioned against the floor surface 22 beneath the upper door member 24, and the upper end portion 28 is pressed upwardly against the downwardly facing surface 25 of the upper door member 24. Then the locking knob 52 is rotated to cause the insert 60 to move so as to press the upper telescoping member 40 against the inside surface of the side wall 46 of the main post 38.

The next step is to position the laser instrument 18 at the desired height. This is accomplished by moving the locking knob 72 to a release position so that the post engaging portion 30 can be moved along the main post 38 (which functions as a guideway) to the proper elevation. The locking knob 72 is rotated into locking engagement; the laser instrument is adjusted so as to be in a horizontal position, and the laser instrument 18 is activated to cause it to direct its beam laterally against its surrounding wall surfaces.

Usually, the carpenter can make a fairly close approximation of the proper level of the laser instrument 18 by moving the post engaging member 30 to its desired position by using the reference line 86 so that this line 86 is at the desired height elevation. Then an up or down adjustment can be made as needed.

It sometimes happens that the floor of the room may be slanted to a small extent. In this instance, the carpenter installing the cabinet may want to make allowance for this by inserting shims or other leveling devices to bring the cabinet to a horizontal alignment within closer tolerances. Let us assume that the carpenter has measured up a certain height from the floor and has ascertained the target level for the countertop. The workman will then make a final adjustment to the mounting section 16, moving it a short distance upwardly or downwardly so that the laser beam is at precisely the proper height elevation.

A typical instrument which could be used in the present invention which in one made by MOMENTOM LASER. This instrument transmits a beam which has a vertical thickness dimension of about 1/8 inch, and is sufficiently bright to be readily observable in most all building interiors. The beam scans along the wall, and it is a very simple matter to match the height of the beam to a marking on the wall, and/or place the marking at the appropriate place where the laser strikes the wall.

In this particular instrument, the laser beam makes an entire scan of the wall surface about 200 times per minute. Accordingly, the carpenter has a substantially constant reference line, accurately located and easily readable. Then the carpenter proceeds with the work of properly positioning the cabinets and countertops to the proper location and then completing the installation.

In some instances, a nearby doorway is not available, so that the apparatus 10 need to be installed so as to reach from the floor surface 22 to a ceiling surface. The apparatus 10 is arranged so that the inner-telescoping section 40 can be extended out to almost seventy inches beyond the more normal eighty inch length dimension that would be expected in doorways. This extension is accomplished as indicated above by moving the telescoping section 40 upwardly so that the upper bearing end 28 comes into engagement with the ceiling, and then operating the locking mechanism 50 to maintain the pole section 14 in its operating position.

It will be noted, with reference to FIG. 1 that the mounting section 16 is arranged so that the mounting member 112 and the laser instrument 18 are spaced laterally from the post section 14 is a sufficient distance so that the laser instrument 18 can be positioned at an elevation above the bearing surface 25 when the post 14 is mounted in the doorway. (See FIG. 2). In the event that the laser beam is to be positioned at a very low level adjacent to the floor surface 22, as indicated in FIG. 4, the intermediate mounting member 112 can be inverted, and the laser platform 34 can be placed at what now becomes the upper surface of the horizontal plate 114, as shown in FIG. 10.

From time to time, it may be desired to make small adjustments in the height of the laser instrument 18. For example, the carpenter may make a measurement on the wall and desire to move the reference level up by 3/8 of an inch. In this instance, the carpenter could observe the present location of the reference line 86, make a simple calculation to find the desired elevation, and then move the mounting section 16 up until the reference line 86 matches the proper calculated measurement. After that, the carpenter may wish to make a further adjustment by simply moving the clear plastic plate 82 itself so as to move the reference line 86 to an elevation marking that corresponds exactly to the desired reference elevation on the wall. For example, the floor location where the apparatus 10 is positioned may be a slight distance below what is desired. Yet, the carpenter wants to set the reference line 86 so that it is at the dimension which corresponds with the height dimension at the actual installation location adjacent to the wall. This can be done by simple adjustment to the plate 82, while leaving the mounting section 16 in its proper position.

FIGS. 11–14 show a second embodiment of the present invention. Components of the second embodiment which are similar to the first embodiment will be given like numerical designations, with an "a" designation distinguishing those of the second embodiment.

Figure 12:
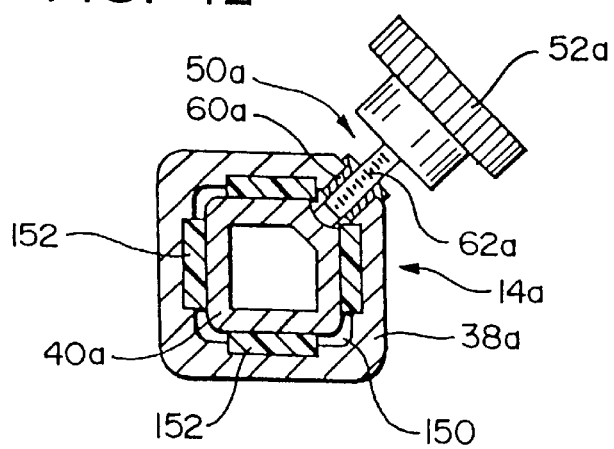
FIG. 12 is a cross-sectional view of the post at the location of the post locking mechanism.
Figure 13:
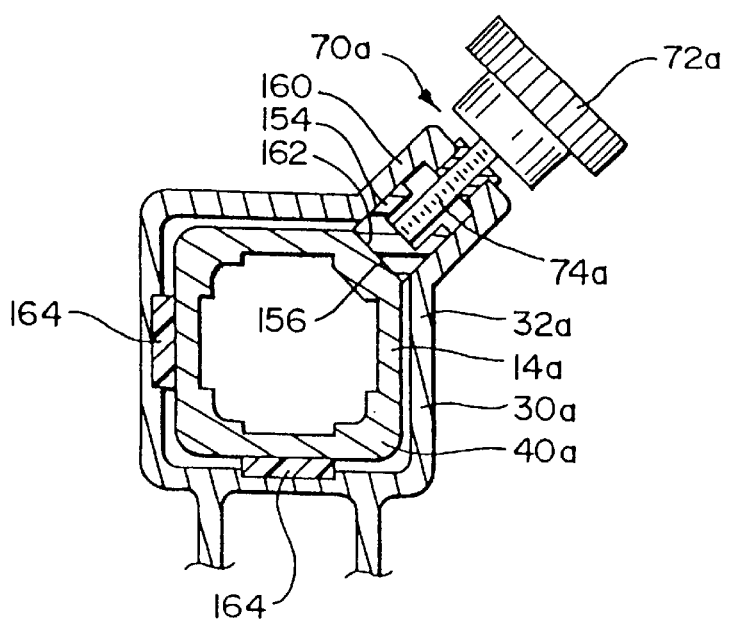
FIG. 13 is a cross-sectional view of the post at the location of the locking mechanism for the laser mounting instrument.
Figure 14:
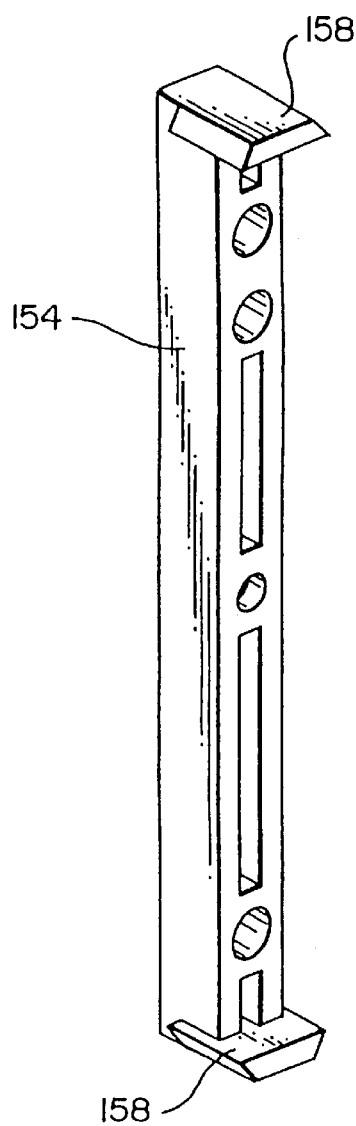
FIG. 14 is an isometric view of an insert shown in section in FIG. 13.

FIG. 12 is a cross-sectional view of the post 14a showing the two telescoping post sections 38a and 40a and the post locking mechanism 50a, and FIG. 13 is a cross-sectional view through the post 14a where the locking mechanism 70a is located.

The post section of 38a has a square tubular cross-sectional configuration, and likewise the inner post section 40a has a matching square cross-sectional configuration. The outer wall of the inner telescoping member 40a is spaced a short distance inwardly from the inner wall of the outer telescoping section 38a leaving a small width gap 150. A plurality of pads 152 are positioned between the members 38a and 48a to provide proper sliding engagement.

The locking device 50a comprises a handle 52a secured to a bolt 62a that is threaded into an insert 60a. By rotating the handle 52a, the inner tube section 40a can be locked in place. The bolt 62a is at a 45 degree angle to the adjacent sidewalk and leans against a matching flattened and concave edge portion.

FIG. 13 is a cross-sectional view taken at the location of the mounting section 18 on the post section 40a. More particularly, this section is taken at the location of the locking mechanism 70a of the post engaging section 30a. There is a handle 32a attached to a bolt 74a which in turn engages a elongate insert 154 (shown in FIG. 14). This insert 154 has a bearing face 156 and top and lower protruding members 158. This insert 154 fits in a housing section 160, this being an elongate member having a U-shaped cross-section extending the length of the mounting section 18.

The bearing surface 156 presses against a matching bearing surface 162 which is aligned at 45 degrees from the two adjacent wall sections of the post section 40a, this bearing surface 162 comprising a flattened edge corner portion of the post section 40a.

In operation, the handle 72a is rotated to cause the bearing end of the bolt 14a to engage the insert 154 to press the bearing surface 156 into engagement with the bearing surface 162 to hold the post engaging portion 30a securely in place. Pads 164 are provided to provide for proper sliding engagement, and also to securely hold the post engaging portion 30a in place.

It is to be recognized that various modifications could be made to the present invention without departing from the basic teachings thereof. For example, the cross-sectional configurations in relative positioning of the main post 38 and the extendible member 40 could be modified to different cross-sectional configurations and relative positions. For example, the components could be made as an I beam section, matching S sections or U sections, etc. Further, the precise means of making the vertical extensions could be modified, such as by placing a screw jack member adjacent to the bottom portion of the post. While the post engaging member 30 is shown as having a slide mount where it encloses the post 38, this could be made more in the form of a wheeled member that travels up and down a post having a more rail-like structure. Further, the intermediate mounting members could have different adjustments, both vertical and angular added thereto. It is to be recognized that such modifications are intended to be included within the broader scope of the present invention.

I claim:

1. A system for establishing a substantially horizontal reference line on a target surface the location of which is fixed relative to first and second support surfaces, the system comprising:
   a post member defining a post axis and having a first end engaging the first support surface and second end engaging the second support surface, where the post member comprises first and second post sections movable relative to each other along the post axis, where the first post section defines the first end of the post member and the second post section defines the second end of the post member;
   a mounting member that, in a first state, engages the post member such that the mounting member may be moved along the post axis relative to the post member but may not move radially relative to the post axis;
   a locking assembly for selectively securing the mounting member at a desired location along the post member; and
   a lighting assembly that generates a light beam at a predetermined angle with respect to true horizontal; wherein
   the lighting assembly is supported by the mounting member such that the light beam illuminates a target portion of the target surface and the target portion of the target surface has a predetermined relationship with the desired location along the post member.

2. A system as recited in claim 1, in which the post member further comprises a post locking system for selectively fixing the location of the first and second post sections relative to each other.

3. A system as recited in claim 1, in which the mounting member comprises a lock portion that is secured to the post member by the locking assembly and a device portion that is rotatable about a mounting axis relative to the lock portion.

4. A system as recited in claim 1, in which the mounting member, when in a second state, may be detached from the post member.

5. A system for establishing a reference line on a target surface the location of which is fixed relative to first and second support surfaces, the system comprising:
   a post member defining a post axis and having a first end engaging the first support surface and an second end engaging the second support surface, where the post member comprises first and second post sections movable relative to each other along the post axis, where the first post section defines the first end of the post member and the second post section defines the second end of the post member;
   a mounting member that, in a first state, engages the post member such that the mounting member may be moved along the post axis relative to the post member but may not move radially relative to the post axis;
   a locking assembly for selectively securing the mounting member at a desired location along the post member; and
   a lighting assembly that generates a rotating light beam that defines a light plane; wherein
   the lighting assembly is supported by the mounting member such that the light beam illuminates a target portion of the target surface and the target portion of the target surface has a predetermined relationship with the desired location along the post member.

6. A system as recited in claim 5, in which the post member further comprises a post locking system for selectively fixing the location of the first and second post sections relative to each other.

7. A system as recited in claim 5, in which the mounting member comprises a lock portion that is secured to the post member by the locking assembly and a device portion that is rotatable about a mounting axis relative to the lock portion.

8. A system as recited in claim 5, in which the mounting member, when in a second state, may be detached from the post member.

9. A method of establishing a reference line on a target surface the location of which is fixed relative to first and second support surfaces, the method comprising the steps of:
   providing a post member defining a post axis and having a first end and a second end;
   moving a first section of the post member relative to a second section of the post member along the post axis, where the first post section defines the first end of the post member and the second post section defines the second end of the post member
   arranging the post member such that the first end engages the first support surface and the second end engages the second support surface;
   mounting on the post member a lighting assembly that generates a light beam;
   moving the lighting assembly to a desired location along the post axis such that the light beam illuminates a target portion of the target surface;
   securing the lighting assembly at the desired location; and
   moving the light beam to define a light plane that forms the reference line on the target surface.

10. A method as recited in claim 9, further comprising the step of selectively fixing the location of the first and second post sections relative to each other.

11. A method as recited in claim 9, further comprising the step of rotating the lighting assembly relative to the post member between first and second lighting positions.

12. A method as recited in claim 9, further comprising the step of detachably securing the lighting assembly to the post member.

13. A system for establishing a substantially horizontal reference line on a target surface the location of which is fixed relative to first and second support surfaces, the system comprising:
   a post member defining a post axis and having a first end engaging the first support surface and second end engaging the second support surface;
   a mounting member that, in a first state, engages the post member such that the mounting member may be moved along the post axis relative to the post member but may not move radially relative to the post axis, the mounting member comprising a lock portion that is secured to the post member by a locking assembly and a device portion that is rotatable about a mounting axis relative to the lock portion;
   wherein the locking assembly selectively secures the mounting member at a desired location along the post member; and
   a lighting assembly that generates a light beam at a predetermined angle with respect to true horizontal; wherein
   the lighting assembly is supported by the mounting member such that the light beam illuminates a target portion of the target surface and the target portion of the target surface has a predetermined relationship with the desired location along the post member.

14. A system for establishing a reference line on a target surface the location of which is fixed relative to first and second support surfaces, the system comprising:

a post member defining a post axis and having a first end engaging the first support surface and an second end engaging the second support surface;

a mounting member that, in a first state, engages the post member such that the mounting member may be moved along the post axis relative to the post member but may not move radially relative to the post axis, where the mounting member comprises a lock portion that is secured to the post member by a locking assembly and a device portion that is rotatable about a mounting axis relative to the lock portion;

wherein the locking assembly selectively secures the mounting member at a desired location along the post member; and a lighting assembly that generates a rotating light beam that defines a light plane; wherein the lighting assembly is supported by the mounting member such that the light beam illuminates a target portion of the target surface and the target portion of the target surface has a predetermined relationship with the desired location along the post member.

15. A method of establishing a reference line on a target surface the location of which is fixed relative to first and second support surfaces, the method comprising the steps of:

providing a post member defining a post axis and having a first end and a second end;

moving a first section of the post member relative to a second section of the post member along the post axis, where the first post section defines the first end of the post member and the second post section defines the second end of the post member arranging the post member such that the first end engages the first support surface and the second end engages the second support surface;

mounting on the post member a lighting assembly that generates a light beam;

moving the lighting assembly to a desired location along the post axis such that the light beam illuminates a target portion of the target surface;

securing the lighting assembly at the desired location; and moving the light beam to define a light plane that forms the reference line on the target surface.

16. A method of establishing a reference line on a target surface the location of which is fixed relative to first and second support surfaces, the method comprising the steps of:

providing a post member defining a post axis and having a first end and a second end;

arranging the post member such that the first end engages the first support surface and the second end engages the second support surface;

mounting on the post member a lighting assembly that generates a light beam;

rotating the lighting assembly relative to the post member between first and second lighting positions;

moving the lighting assembly to a desired location along the post axis such that the light beam illuminates a target portion of the target surface;

securing the lighting assembly at the desired location; and moving the light beam to define a light plain that forms the reference line on the target surface.

* * * * *